3,159,669
PROCESS FOR PHOSPHORAMIDIC ACID
DERIVATIVES
Francis L. Scott, Lynnewood Gardens, Elkins Park, Pa.,
assignor to Pennsalt Chemicals Corporation, Philadelphia, Pa., a corporation of Pennsylvania
No Drawing. Filed Apr. 14, 1960, Ser. No. 22,097
10 Claims. (Cl. 260—500)

This invention deals with a novel process for preparing N-aryl phosphoramidic acids and their mono-aryl-esters which compounds have the formula:

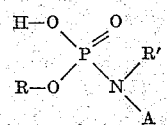

where R is hydrogen or an aromatic radical, R' is an aryl radical and A is hydrogen or an alkyl radical.

Phosphoramidic acids and esters of the above structure are known compounds and have various uses, particularly in fields of animal physiology and pharmacology (e.g., nerve depressants and stimulants, etc.). Because of their strong physiological effects they can also be used as poisons for lower animals and plants and thus they are effective bactericides, insecticides and fungicides. Heretofore, these compounds have been made only with difficulty and in several steps. In one technique, use is made of the known monodealkylation of phosphoramidic diesters with aromatic amines. Thus, Goldwhite et al., in J. Chem. Soc., p. 2409 (1957), treat the di-tert-butyl chlorophosphate with aniline at room temperature, isolate the anilinium salt of the tert-butyl mono-ester of N-phenyl phosphoramidic acid formed, and then they subject this dry salt to pyrolysis to dealkylate the remaining tert-butyl group. This stepwise procedure was required because simple dealkylation of more than a single alkyl group of a phosphoramidic acid diester has not been accomplished heretofore. In another technique to obtain phosphoramidic acids Cook et al. in J. Chem. Soc., 2922 (1949), disclose the hydrogenolysis of a dibenzyl ester of N-phenyl phosphoramidic acid. Such processes are of limited usefulness not only because they are complex, but also because they require that the alkyl groups have a particular configuration and be susceptible to pyrolytic elimination (e.g. a tert-alkyl group) or to hydrogenolysis (e.g. a benzyl radical). It is therefore obvious that more versatile procedures for phosphoramidic acids are desirable.

Now it has been found that the above phosphoramidic acids can very readily be prepared according to the novel process of this invention which comprises treating at a temperature of at least about 130° C. a mono-aryl amine selected from the group of primary and secondary mono-aryl amines with a phosphoryl compound of the structure

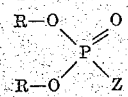

where R is a radical selected from the group of aliphatic and aromatic radicals with the proviso that at least one R radical be bonded to oxygen through a non-aromatic carbon atom, and where Z is a radical selected from the group of azide, halogen and secondary amino radicals. The process is represented by the following equations:

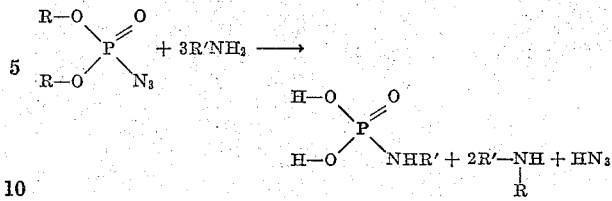

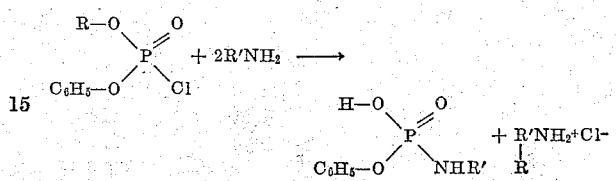

and

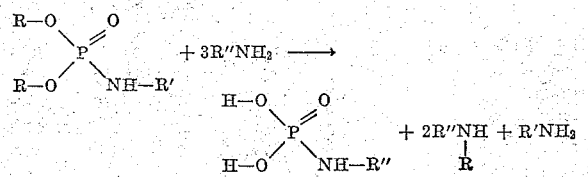

It is readily observed from these equations that a surprising feature of this process is the dealkylation of the ester groups to acid groups. It is also quite surprising that this process is operable only with the phosphoryl compound; e.g.,

and not with thiophosphoryl compounds of the following structure:

In carrying out this process, the general procedure involves mixing the reactants in the presence of a liquid medium and heating at an elevated temperature of at least about 130° C., but below about 250° C. to prevent pyrolysis effects. The solid product which forms is then simply filtered off, purified, if desired, by leaching with water or organic solvents and it is then dried.

The liquid medium in which the reaction is carried out is usually an excess of the primary or secondary aryl amine reactant. However, the reactants may be dissolved in inert solvents and the process carried out in this manner quite readily. In order to avoid using superatmospheric pressures, solvents will be selected which boil at about 130° C. or higher and the reaction carried out simply by refluxing the reactant solution. Useful solvents include the aromatic hydrocarbons such as the xylenes and cumene, the aromatic petroleum solvents, the terpene solvents (e.g. turpentine, dipentene, pine oil), the higher boiling ethers such as glycols and glycol ethers (e.g. ethylene glycol monomethyl ether), ketones such as methylisobutyl ketone, nitrated aromatic hydrocarbons e.g. nitrobenzene), and the like. Preferably, the reaction will be carried out simply with an excess of the amine reactant since such procedure generally results in a more rapid reaction and somewhat higher yields.

As indicated, the mono-aryl amine reactant that is used is a primary or secondary amine and will include compounds such as phenyl and naphthylamines and their N-alkyl substituents. Thus useful amines will include aniline, N-methylaniline, N-ethylaniline, N-butylaniline, o-toluidine, N-isopropyl - p - toluidine, α-naphthylamine, N-ethyl-β-naphthylamine, and the like. Also useful are those mono-aryl primary and secondary amines which are substituted with functional groups inert to the reactants and products; e.g. substituents such as halogen, alkoxyl, nitro, hydroxyl, thioalkoxyl, and sulfhydryl radicals. Other compounds may also be used providing they are mono-aryl amines and are thus weak bases having basicities on the order of aniline and N-methylaniline (i.e. with $pK_a$ values of about 4 to 6). Use of N,N-diarylamines, on the other hand, have little practical value because they are so weak that the reaction proceeds very slowly, if at all.

The amounts of aryl amine reactant to be used in this process should be in excess of that stoichiometrically required according to the equations shown above. Usually, when used in the absence of other solvent, the amount of aryl amine will be between about a three and about a twenty fold molar excess of the phosphorus compound taken and preferably about a five to ten fold excess will be used. Likewise, when solvents are employed, the amount of aryl amine will be on the same order.

The phosphorus compound reactant, as indicated above, will be a phosphoryl azide, a halophosphate, or a phosphoramidate. As indicated, at least one R radical of the phosphorus compound must be connected to its corresponding oxygen atom through a non-aromatic carbon atom. This limitation is required for dealkylation to occur and produce the acid as shown in the above equation. If both R radicals are aryl, the process of this invention is inoperable at practical temperatures, i.e. up to about 250° C., at which temperature, at least partial thermal decomposition of reactants and products is likely to occur. On the other hand, only one R radical need be attached to the oxygen atom through a non-aromatic carbon atom (and thus aliphatic in nature) in order for the benefits of this process to be obtained. In this latter case, when one R is an aryl radical and attached to the oxygen atom through an aromatic carbon atom, the product obtained will be a mono-aryl ester of the phosphoramidic acid. It is to be understood from the above that the term "aliphatic" here refers also to cycloaliphatic and to substituted aliphatic radicals such as aralkyl radicals (e.g. benzyl) and phosphorus compounds substituted with such radicals will be operable in this process.

When the phosphorus compound reactant is a phosphoryl azide, it will be obtained by reaction of an alkali metal azide (e.g., $NaN_3$) with an O,O'-disubstituted halophosphate. These compounds and this method of making them are described in the abandoned application of Francis L. Scott, Serial No. 22,096, filed of even date herewith. Although the phosphoryl azide reactant is quite toxic and must be handled with care, it has the advantage of yielding a volatile by-product (hydrazoic acid). Thus when using this reactant the hydrazoic acid is simply volatilized from the reaction mass and the separation and purification of the product is simplified. Examples of useful phosphoryl azides include O,O'-diethoxyphosphoryl azide, O,O'-dicyclohexyloxyphosphoryl azide, O-methoxy-O'-phenoxyphosphoryl azide, and the like.

The halophosphate reactants of structure

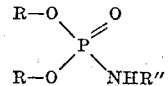

where X is halogen having an atomic weight below 80 (e.g., F, Cl, or Br) are known compounds whose properties and preparation are disclosed by Kosolopoff in his book "Organic Phosphorus Compounds," John Wiley and Sons, 1950 (see particularly pages 242 et seq.). Examples of useful halophosphates include O,O'-dimethyl fluorophosphate, O,O'-diethyl chlorophosphate, O,O'-diisopropyl fluorophosphate, O,O'-dicyclohexyl fluorophosphate, O-n-butyl-O'-ethyl fluorophosphate, O-ethyl-O'-phenyl chlorophosphate, O-isoamyl-O'-phenyl bromophosphate, O,O'-dibenzyl chlorophosphate, and the like.

Likewise, the phosphorus compounds of structure

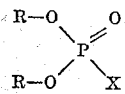

are disclosed by Kosolopoff on page 306 et seq. of his book. Useful compounds in this class include those compounds where the R groups are exemplified above and where R″ is methyl, ethyl, propyl, isopropyl, n-butyl, sec-butyl, iso-butyl, iso-amyl, decyl, lauryl, octadecyl, phenyl, naphthyl, tolyl, xylyl, benzyl, and the like. It will be observed in the above equation exemplifying this class of phosphorus compounds reactants that the reaction shows not only cleavage of the ester, but also an interchange reaction occurring at the —NHR″ radical. It will be understood in considering this reaction that where the R″ radical is one derived from the amine reactant (e.g. R″ is phenyl and the aryl amine is aniline) the interchange occurs, but the effect of the reaction appears to be only ester dealkylation to the acid product. On the other hand, when the aryl amine reactant is different from the R″ radical, the amido group of the resultant product is also changed. Thus:

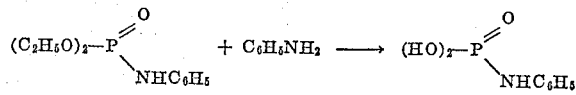

but

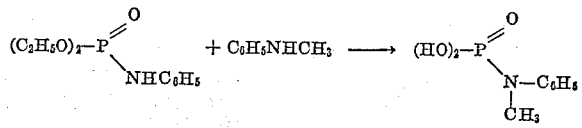

Thus, this reaction provides a means to a wide variety of novel phosphoramidic acids, the product being governed by the choice of the primary or secondary aryl amine.

When a phosphoryl azide or halophosphate is used it is believed that the process of this invention proceeds through two distinct steps. The reaction of the aryl amine reactant to form the phosphoramidic ester is thought to occur first and this reaction proceeds rapidly even at room temperaures. Then, under the influence of the higher temperature the dealkylation reaction occurs. It is significant to note that this dealkylation is a displacement reaction yielding the phosphoramidic acid and alkylated aryl amine as by-product. Thus, this process is further distinguished from the pyrolysis or hydrogenolysis reactions of the prior art.

In all of the above classes and species of phosphorus compounds it is preferred to use those where R is a radical containing from one to six carbon atoms since such compounds yield a more rapid and efficient process.

The following examples serve to further illustrate this invention:

EXAMPLE 1

Preparation of N-Phenylphosphoramidic Acid

A sample of O,O'-diethoxyphosphoryl azide is charged into 150 g. of freshly distilled aniline, and the mixture is refluxed overnight, with adequate scrubbing and ventilation precautions due to the toxicity of the azide. It is thus heated at 185° C. for 17.5 hours. An aliquot is then taken and infrared analysis indicates approximtely 10% unreacted azide. The mixture is then reheated and 6½ hours later another aliquot is taken and it reveals the presence of 3% unreacted azide. The solution is then refluxed for another 17 hours, and an aliquot reveals only a trace amount of azide character remaining. The mixture is cooled and filtered. It is then triturated 5 times with anhydrous ether and the white residual solid is dried to constant weight (29.3 g.) (M.P. 280-288° C.). A sample is leached twice with absolute ethanol at room temperature and once with boiling ethanol. Its color whitens and it melts at 280-286° C.

*Analysis.*—Calcd. for $C_6H_8NPO_3$: C, 41.62; H, 4.62; N, 8.09; P, 17.91. Found: C, 41.42; H, 4.62; N, 8.53; P, 18.06.

The product is insoluble in either hot or cold ethanol, ether, acetone, dimethylformamide and water. However, the product does dissolve in 0.5 N NaOH and in hot 0.5 N HCl, thus suggesting its amphoteric nature.

When a few crystals of the product are placed in a depression made in nutrient agar inoculated with *Staphylococcus aureus* and the culture incubated for 24 hours, a ring of inhibited growth is evident around the depression containing the N-phenylphosphoramidic acid.

EXAMPLE 2

To 99.3 g. (1.07 g. moles) of freshly distilled aniline is added 23.2 g. (0.133 g. mole) of freshly distilled O,O'-diethylchlorophosphate. There is an immediate and vigorously exothermic reaction. The mixture is then refluxed for 40 minutes with stirring, the mass then being cooled and filtered. The dry white solid (23.8 g.) which is thus obtained is leached successively with water and absolute ethanol, and the product remaining undissolved weighs 15.2 g. and melts at 276°-277° C. The yield is 66% and the material corresponds to N-phenylphosphoramidic acid.

*Analysis.*—Calcd. for $C_6H_8NO_3P$: C, 41.62; H, 4.62; N, 8.09; P, 17.91. Found: C, 41.44; H, 4.39; N, 8.12; P, 17.56.

A mixed melting point with an authentic sample of N-phenylphosphoramidic acid shows no depression.

When in the above example, O,O'-diethylchlorothiophosphate

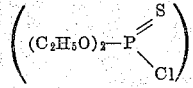

is used instead of O,O'-diethylchlorophosphate, the reaction mass becomes first red, then yellow and sulfurous vapors are released. A gelatinous precipitate also forms from which is extracted a solid melting at 225°-232° C. which cointains phosphorous, nitrogen, but no sulfur. The compound appears to be a complex product of unknown identity.

EXAMPLE 3

To 1.56 g. (0.0065 g. mole) of O,O'-diethyl-N-phenylphosphoramidate is added 14.97 g. (0.161 g. mole) of aniline. The clear solution is then refluxed for 11 minutes by which time a white precipitate has formed. The mixture is cooled and filtered. The residue is leached with ether and washed with benzene, resulting in 0.83 g. (71% yield) of a solid product (M.P. 274°-276° C.). This product is insoluble in water, ethanol, benzene and acetone. It does not depress the melting point of authentic N-phenylphosphoramidic acid.

*Analysis.*—Calcd. for $C_6H_8NO_3P$: C, 41.62; H, 4.62; N, 8.09; P, 17.91. Found: C, 41.51; H, 4.77; N, 8.93; P, 17.42.

EXAMPLE 4

A solution of 5.0 g. (0.0218 mole) of O,O'-diethyl-N-phenylphosphoramidate and 12.2 g. (0.131 mole) of redistilled aniline in 100 ml. of xylene is refluxed for 24 hours. A white insoluble material slowly deposits. After cooling, the solution is filtered and the white material is washed with ether. It is N-phenylphosphoramidic acid (1.17 g., 6.76 m. moles) obtained in 31% yield.

EXAMPLE 5

A mixture of 5.0 g. of O,O'-diethyl-N-phenylphosphoramidate and 66.0 g. of purified p-chloroaniline is heated at 180-183° for 3 hours, with vigorous stirring throughout. The mixture is filtered hot and 8.25 g. of a grey solid is isolated. This material is then leached with three 80 ml. portions of ether and it yields 3.0 g. of ether insoluble material, M.P. 288-294° with decomposition, thus confirming the product as N-p-chlorophenylphosphoramidic acid.

EXAMPLE 6

When Example 3 is repeated except that O,O'-di-n-butyl-N-phenylphoramidate is used instead of O,O'-diethyl-N-phenylphosphoramidate the reaction proceeds in a similar manner yielding N-phenylphosphoramidic acid.

As pointed out in the above discussion and examples, the process of this invention proceeds at temperatures of at least about 130° C. Experiments show that this is a critical limitation since reaction below about 130° C. results in either no reaction or a reaction so slow as to be impractical. For example, when Example 3 is repeated at 75° C. and held for 72 hours it is found that no N-phenyl phosphoramidic acid can be isolated. Also when Example 4 is repeated in refluxing benzene (80.1° C.) no N-phenyl phosphoramidic acid is obtained. Refluxing O,O'-diethyl-N-phenyl phosphoramidate with aniline in toluene (110° C.) for 24 hours produces only a few crystals of product and the reaction is considered impractical at this temperature. As seen in Example 4, however, when carried out in refluxing xylene (b.p. 138° C.) the reaction does proceed at a reasonable rate.

It will be understood by the skilled art worker that many changes and variations may be made in this invention without departing from its spirit and scope.

I claim:

1. A process for the preparation of N-aryl phosphoramidic acids and their mono-aryl esters which comprises reacting at a temperature between about 130° and 250° C. a mono-aryl amine selected from the class of primary and secondary mono-aryl amine containing 6 to 10 carbon atoms and having a $pK_a$ value between about 4 and about 6 selected from the class consisting of primary amines, N-lower alkyl secondary amines, and ring-substituted halo derivatives of said primary and secondary amines, with a phosphorous compound of the structure

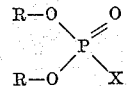

where R is a radical containing between one and six carbon atoms and selected from the group of saturated aliphatic hydrocarbon and aromatic hydrocarbon radicals with the proviso that at least one R radical be bonded to an oxygen atom through a non-aromatic carbon atom, and where X is a radical selected from the group consisting of azide, halogen having an atomic weight below 80 and secondary amino radicals.

2. A process for the preparation of N-aryl phosphoramidic acids which comprises reacting at a temperature betwen about 130° and about 200° C. a mono-aryl amine containing 6 to 10 carbon atoms and having a $pK_a$ value between about 4 and about 6 selected from the class consisting of primary amines, and N-lower alkyl secondary amines and ring-substituted halo derivatives of said primary and secondary amines, with a phosphorous compound of structure

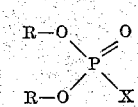

where the R radicals are lower alkyl radicals and X is an anilino radical.

3. The process of claim 1 carried out by fluxing in an inert solvent boiling at atmospheric pressure between about 130° C. and 250° C.

4. The process of claim 1 carried out by fluxing in an aromatic hydrocarbon solvent boiling at atmospheric pressure between about 130° C. and 250° C.

5. The process of claim 4 in which the aromatic hydrocarbon solvent is xylene.

6. The process of claim 1 wherein the phosphorus compound is O,O'-diethoxyphosphorylazide.

7. The process of claim 1 wherein the phosphorus compound is diethylchlorophosphate.

8. The process of claim 7 wherein the mono-aryl amine is aniline.

9. The process of claim 7 wherein the mono-aryl amine is p-chloroaniline.

10. The process of claim 2 wherein the phosphorus compound is O,O'-diethyl-N-phenyl phosphoroamidate.

References Cited in the file of this patent
UNITED STATES PATENTS

| | | |
|---|---|---|
| 2,587,549 | Trementozzi | Feb. 26, 1952 |
| 2,842,527 | Melamed | July 8, 1958 |

OTHER REFERENCES

Goldwhite et al.; J. Chem. Soc. (London), vol. of 1957, pp. 2409–2412.

UNITED STATES PATENT OFFICE
CERTIFICATE OF CORRECTION

Patent No. 3,159,669            December 1, 1964

Francis L. Scott

It is hereby certified that error appears in the above numbered patent requiring correction and that the said Letters Patent should read as corrected below.

Column 6, lines 43 and 44, strike out "selected from the class of primary and secondary mono-aryl amine"; line 56, after "group" insert -- consisting --; column 7, lines 3 and 6, for "fluxing", each occurrence, read -- refluxing --.

Signed and sealed this 4th day of May 1965.

SEAL)
Attest:

ERNEST W. SWIDER            EDWARD J. BRENNER
Attesting Officer               Commissioner of Patents